United States Patent [19]

Tabana et al.

[11] 4,073,831

[45] Feb. 14, 1978

[54] THERMOPLASTIC RESIN COMPOSITION

[75] Inventors: Minoru Tabana, Suita; Tatsuyuki Mitsuno, Toyonaka; Hiroshi Maki, Takatsuki; Shizuo Narisawa, Ichihara, all of Japan

[73] Assignee: Sumitomo Chemical Company, Limited, Osaka, Japan

[21] Appl. No.: 545,350

[22] Filed: Jan. 30, 1975

[30] Foreign Application Priority Data

Feb. 2, 1974 Japan .................................. 49-13924

[51] Int. Cl.$^2$ ............................................. C08L 53/00
[52] U.S. Cl. .............................. 260/876 B; 260/880 B
[58] Field of Search ........................ 260/876 B, 880 B

[56] References Cited

U.S. PATENT DOCUMENTS

| 3,792,127 | 2/1974 | Gillies | 260/880 B |
|---|---|---|---|
| 3,862,251 | 1/1975 | Strecker | 260/880 B |
| 3,872,068 | 3/1975 | Horiie et al. | 260/880 B |
| 3,873,645 | 3/1975 | Muirhead et al. | 260/879 |
| 3,906,058 | 9/1975 | Durst | 260/876 B |
| 3,907,930 | 9/1975 | O'Grady | 260/876 B |

FOREIGN PATENT DOCUMENTS

| 1,145,923 | 3/1969 | United Kingdom | 260/876 B |

*Primary Examiner*—Murray Tillman
*Assistant Examiner*—Thurman K. Page
*Attorney, Agent, or Firm*—Stevens, Davis, Miller & Mosher

[57] ABSTRACT

A novel thermoplastic resin composition consisting essentially of polystyrene and a styrene-butadiene block copolymer. This resin composition is transparent, is excellent in mechanical properties, particularly in elongation, impact strength, and stiffness, is not liable to become cloudy on being bent, and is favorable in hinging endurance as well as in thermal resistance.

6 Claims, No Drawings

THERMOPLASTIC RESIN COMPOSITION

This invention relates to a thermoplastic resin composition. More particularly, it relates to a resin composition consisting essentially of a styrene-butadiene block copolymer and polystyrene, which composition is transparent, excellent in mechanical properties, particularly in elongation, impact strength, and stiffness, is not liable to become cloudy on being bent, and has a favorable hinging endurance and an excellent thermal resistance.

Polystyrene has long been used in a broad variety of uses such as transparent containers, household utensils, etc., owing to its light weight, inexpensiveness, excellent transparency and appearance, and good processibility. Progress in exploitation of new uses for polystyrene, however, has considerably been retarded, particularly in recent years, on account of its insufficient toughness leading to formation of cracks or fissures during molding or subsequent releasing operation or to breakage under the impact exerted on being dropped, when articles of intricate design are fabricated to meet recent diversified demands.

Consequently, various attempts have heretofore been made to improve the above-noted disadvantages of polystyrene while maintaining its transparency. In these attempts, those which have proved successful to some degree are (1) a method which makes use of a polystyrene having an extremely high molecular weight as compared with an ordinary polystyrene, jointly with a flow-improving agent incorporated therein to secure processibility (the resin in accordance with this method is hereinafter referred to as "high-molecular-weight polystyrene"), (2) a method which utilizes a three-component copolymer resin, transparent and highly resistant to impact, which comprises methyl methacrylate, butadiene, and styrene (the resin in accordance with this method is hereinafter referred to as "MBS resin"), and (3) a method in which a transparent and highly tough block copolymer comprising styrene and butadiene is used (the resin in accordance with this method is hereinafter referred to as "styrene-butadiene block copolymer resin"). However, the high-molecular-weight polystyrene is still inferior in toughness. Although more favorable in toughness as compared with conventional polystyrene, both MBS resin and styrene-butadiene block copolymer resin are slightly inferior in transparency and considerably higher in cost and particularly the styrene-butadiene block copolymer resin is inferior in stiffness, surface hardness, and thermal resistance so that it has been used only in a limited range including film and sheeting.

The present inventors have found that by combining polystyrene and a specific styrene-butadiene block copolymer into a composition to integrate the advantages of both of said polymers, it is possible to obtain a polystyrene resin composition which is transparent, excellent in mechanical properties, particularly in elongation, impact strength, and stiffness, not liable to become cloudy on being bent, has a favorable hinging endurance and thermal resistance, and is inexpensive.

An object of this invention is to provide a novel resin composition consisting essentially of polystyrene and a styrene-butadiene block copolymer which is transparent and excellent in mechanical properties.

Other objects and advantages of this invention will become apparent from the following description.

According to this invention, there is obtained an inexpensive polystyrene resin composition having a high transparency and well-balanced physical properties by mechanically mixing a polystyrene resin prepared in a customary manner with a styrene-butadiene block copolymer represented by the general formula $A_1—B_1—C—B_2—A_2$, wherein $A_1$ and $A_2$ represent non-elastomeric blocks composed of polymeric styrene chains, $B_1$ and $B_2$ represent elastomeric blocks composed of random-copolymer chains containing styrene and butadiene units uniformly distributed therein, C represents an elastomeric block composed of a polymeric butadiene chain or a styrene-butadiene copolymer chain, the total amount of $A_1$ and $A_2$ is 40 to 80% by weight, the total amount of $B_1$ and $B_2$ is 10 to 60% by weight, the amount of C is 0 to 25% by weight provided that the amount of C is smaller than the total amount of $B_1$ and $B_2$, the weight ratio of $A_1$ to $A_2$ is 2 : 8 to 8 : 2, the weight ratio of $B_1$ to $B_2$ is 0 : 10 to 10 : 0, the weight ratio of styrene to butadiene in $B_1$ and $B_2$ is 10 : 90 to 75 : 25, and the weight ratio of styrene to butadiene in C is 0 : 100 to 10 : 90; the total styrene content of said styrene-butadiene copolymer being 65 to 90% by weight, the total butadiene content of said block copolymer being 10 to 35% by weight, and said block copolymer having an intrinsic viscosity of 0.35 to 1.8 dl/g, as measured in toluene at 30° C.

Characteristic features of the resin composition relative to the ratio of the styrene-butadiene block copolymer are explained below in detail. These features depend also on the type of styrene-butadiene block copolymer used.

When the ratio of the styrene-butadiene block copolymer of this invention to polystyrene is in the range from 2 : 98 to 20 : 80, the composition retains such a high transparency, stiffness, and thermal resistance that are characteristic of polystyrene and, in addition, is imparted with sufficient toughness to keep the fabricated article from cracks and fissures which are liable to occur in the deep-drawn articles of intricate design fabricated from conventional polystyrene, at the time of being released from a mold of an injection molding machine or a blow-molding machine, or when such articles are left piled up during transportation or display. When the said ratio is in the range from 20 : 80 to 70 : 30, particularly from 40 : 60 to 60 : 40, the resin composition has a stiffness, surface hardness, thermal resistance, and improved impact strength comparable to those of a rubber-modified polystyrene usually prepared by polymerizing styrene in the presence of a dissolved rubbery substance. Moreover, since the resin composition is transparent, not subject to such a phenomenon of clouding on being bent as is observed in the case of the rubber-modified polystyrene, and has an excellent hinging endurance, it is a so-called clear-and-tough resin composition. The resin composition is suitable for use not only in such articles as, for example, large-sized containers, electrical parts, and food containers, where the same levels of stiffness, impact strength, and thermal resistance as those of a conventional rubber-modified polystyrene are required, but also in a wider range because of its transparency, resistance to clouding on being bent, and excellent hinging endurance. Further, in the range where the said ratio is 70 : 30 to 98 : 2, the resin composition retains the excellent elongation, impact resistance, and resistance to clouding on being bent which are characteristic of a styrene-butadiene block copolymer for use in sheeting and film and, in addition, has sufficient stiffness for use at low cost in ice-cream containers, trays, etc.

As explained above, the resin composition comprising a specified styrene-butadiene block copolymer and polystyrene according to this invention fully exhibits characteristic features of each component in accordance with the proportion thereof and so may be used in a broad range of uses.

The styrene-butadiene block copolymers to be used in the present invention are those represented by the aforesaid general formula.

Referring to the general formula, the proportion of the sum of the amounts of $A_1$ and $A_2$ in the block copolymer is 40 to 80% by weight. If the proportion is below 40% by weight, the block copolymer exhibits rubbery properties and the composition comprising such a block copolymer and polystyrene is markedly inferior in stiffness and thermal resistance, while if the proportion exceeds 80% the composition comprising such a block copolymer and polystyrene becomes insufficient in impact strength and in hinging endurance.

The proportion of the sum of the amounts of $B_1$ and $B_2$ in the block copolymer is 10 to 60% by weight. If the proportion is decreased below 10% by weight, the composition comprising such a block copolymer and polystyrene becomes insufficient in impact strength and hinging endurance, while if the proportion exceeds 60% by weight, the copolymer exhibits rubbery properties and the composition comprising such a block copolymer and polystyrene is markedly deteriorated in stiffness and thermal resistance.

The proportion of C in the block copolymer is 0 to 25% by weight. If the proportion exceeds 25% by weight, the block copolymer becomes lacking in elastomeric properties and the composition comprising such a block copolymer and polystyrene becomes inferior particularly in impact strength and hinging endurance. The proportion of C in the block copolymer should always be smaller than that of the sum of $B_1$ and $B_2$. If such an interrelation is reversed, a composition comprising such a block copolymer and polystyrene becomes inferior in impact strength and hinging endurance.

The suitable weight ratio of styrene to butadiene in $B_1$ and in $B_2$ is 10 : 90 to 75 : 25, because if the ratio falls outside the said range, $B_1$ and $B_2$ are no more able to perform their parts of effectively imparting toughness to the block copolymer. $B_1$ and $B_2$ are random-copolymer chains of styrene and butadiene units uniformly distributed therein. If the distribution is not uniform, the block copolymer lacks in toughness, so that the resin composition comprising such a copolymer and polystyrene is no more satisfactory in impact strength and hinging endurance and becomes liable to be cloudy when bent.

The block copolymer to be used in this invention has an intrinsic viscosity of 0.35 to 1.8 dl/g, as measured in toluene at 30° C. If the intrinsic viscosity is below 0.35 dl/g, the block copolymer is markedly inferior in tensile strength, elongation, and impact strength, while if it exceeds 1.8 dl/g, the block copolymer is markedly deteriorated in flow properties and the composition comprising such a copolymer and polystyrene becomes inferior in processibility.

The styrene-butadiene block copolymer for use in this invention can be prepared generally by the anionic living polymerization technique.

For instance, a block copolymer of the general formula, wherein $B_1$ is present whereas $B_2$ and C are both absent, can be prepared by any of the following methods:

(1) A method which comprises the first step of contacting styrene with an organomonolithium compound in an inert hydrocarbon solvent to convert substantially all of the monomer into a living polymer which is to form the terminal non-elastomeric block $A_1$; the second step of adding, all at a time, a mixture of styrene and butadiene to continue the polymerization in the presence of a polar compound such as an ether compound, thus converting substantially all of the monomers into the middle elastomeric block $B_1$; and the third step of again adding styrene to polymerize and to convert substantially all of the monomer into the terminal non-elastomeric block $A_2$.

(2) A method which comprises the first step of contacting a mixture of styrene and butadiene with an organodilithium compound in an inert solvent in the presence of a polar compound such as an ether compound to convert substantially all of the monomers into a living polymer which is to form the middle elastomeric block $B_1$; and the second step of adding styrene to polymerize, thus converting substantially all of the monomer into the terminal non-elastomeric blocks $A_1$ and $A_2$.

(3) A method, wherein the middle elastomeric block $B_1$ is formed in the method (1) or (2) by adding portionwise or continuously a mixture of styrene and butadiene in a constant ratio.

A block copolymer of the general formula, wherein $B_1$ and C are both present whereas $B_2$ is absent, can be prepared by either of the following methods:

(1) A method which comprises the first step of contacting styrene with an organomonolithium compound in an inert hydrocarbon solvent to convert substantially all of the monomer into a living polymer which is to form the terminal non-elastomeric block $A_1$; the second step of adding, all at a time, a mixture of styrene and butadiene to continue polymerization in the presence of a polar compound such as an ether compound and to convert substantially all of the monomer mixture into the middle elastomeric block $B_1$; the third step of adding butadiene or a mixture of styrene and butadiene in a ratio of 10/90 or smaller to polymerize substantially all of the monomers into the internal elastomeric block C; and the fourth step of adding styrene to polymerize substantially all of the monomer into the terminal non-elastomeric block $A_2$.

(2) A method, wherein the internal elastomeric block $B_1$ is formed in the method (1) by adding portionwise or continuously a mixture of styrene and butadiene in a constant ratio.

A block copolymer of the general formula, wherein all of the C, $B_1$, and $B_2$ are present, can be prepared by any of the following methods:

(1) A method which comprises the first step of contacting styrene with an organomonolithium compound in an inert hydrocarbon solvent to convert substantially all of the monomer into a living polymer which is to form the terminal non-elastomeric block $A_1$; the second step of adding, all at a time, a monomer mixture of styrene and butadiene to continue polymerization in the presence of a polar compound such as an ether compound, thus converting substantially all of the monomers into the internal elastomeric block $B_1$; the third step of adding butadiene or a mixture of styrene and butadiene in a ratio of 10/90 or smaller to polymerize substantially all of the monomer mixture into the internal elastomeric block C; the fourth step of adding, all at a time, a monomer mixture of styrene and butadiene to continue polymerization, thus converting substantially all of the monomer mixture into the internal elastomeric block $B_2$; and the fifth step of adding styrene to polymerize substantially all of the monomer, thus forming the terminal non-elastomeric block $A_2$.

(2) A method which comprises the first step of contacting butadiene or a mixture of styrene and butadiene in a ratio of 10/90 or smaller with an organodilithium compound in an inert hydrocarbon solvent (in the presence of a polar compound such as an ether compound in the case of a monomer mixture) to convert substantially all of the monomers into a living polymer which is to form the middle elastomeric block C; the second step of adding, all at a time, a monomer mixture of styrene and butadiene to continue polymerization in the presence of a polar compound such as an ether compound to convert substantially all of the monomer mixture into the internal elastomeric blocks $B_1$ and $B_2$; and the third step of adding styrene to polymerize substantially all of the monomer, thus forming both of the terminal non-elastomeric blocks $A_1$ and $A_2$.

(3) A method wherein the internal elastomeric blocks $B_1$ and $B_2$ are formed in the method (1) or (2) by adding portionwise or continuously a monomer mixture of styrene and butadiene in a constant ratio.

Examples of inert hydrocarbon solvents for use in the above-said anionic living polymerization are benzene, toluene, xylene, hexane, heptane, cyclohexane, and methylcyclohexane.

Examples of organomonolithium compounds are ethyllithium, propyllithium, n-butyllithium, sec-butyllithium, hexyllithium, and cyclohexyllithium.

Examples of organodilithium compounds are trimethylenedilithium, tetramethylenedilithium, naphthalene-lithium complex, stilbene-lithium complex, and biphenyl-lithium complex. Oligobutadienyldilithium, oligoisoprenyldilithium, and the like in living form may also be used.

The ether compounds for use as a polar compound are, for example, cyclic ethers such as tetrahydrofuran, tetrahydropyran, and the like; and aliphatic monoethers such as diethyl ether, diisopropyl ether, dibutyl ether and the like. Other polar compounds which can be used are amine compounds such as triethylamine, tripropylamine, tributylamine and pyridine. The amount of polar compounds to be used is ordinarily 0.01 to 5, preferably 0.05 to 2, mole-% based on total monomer.

The polymerization is carried out usually at 20° to 120° C. and a pressure sufficient for keeping the monomer and solvent in liquid phase, such as 1 to 20 kg/cm$^2$.

The after-treatment of the polymerizate is carried out in the following way: After completion of the polymerization, the polymerization system is deactivated by addition of water or an alcohol such as methanol, ethanol or isopropanol and the polymer is recovered as precipitate by further addition of an excess of the aforesaid alcohol; or the polymer is recovered by contacting the deactivated polymerization mixture with steam to remove the polymerization solvent by distillation.

The distribution of styrene and butadiene in the elastomeric blocks $B_1$ and $B_2$ is more uniform when these blocks are formed by portionwise or continuous feeding of a mixture of styrene and butadiene in a constant ratio, as compared with the distribution when said blocks are formed by adding the monomer mixture all at a time.

The polystyrene to be used in this invention can be any of the commercial products prepared from styrene by known methods such as bulk, suspension, solution, or emulsion polymerization. The molecular weight of such polystyrene is 150,000 to 500,000, preferably 200,000 to 400,000.

Mixing of the styrene-butadiene block copolymer and polystyrene can be carried out by use of known means such as, for example, mixing roll, Banbury mixer, and extruder. The resin composition obtained can be processed by customary techniques such as injection molding, blow molding, extrusion molding, and vacuum forming, to yield excellent articles.

It is needless to say that the present resin composition can be incorporated with ordinary additives such as, for example, stabilizers, colorants, and lubricants. Such additives may disperse uniformly in the resin composition to mainfest intended effects.

The invention is illustrated below in further detail with reference to Examples and Referential Examples.

REFERENTIAL EXAMPLE

The styrene-butadiene block copolymers to be used in Examples were prepared in the following way.

Preparation of styrene-butadiene block copolymer A

Into a 25-liter autoclave provided with a stirrer and a jacket, the air in which having been replaced with nitrogen, were charged 15 liters of benzene used as solvent, 1.25 kg of styrene, 9.0 g of tetrahydrofuran, and a benzene solution containing 75 millimoles of n-butyllithium used as initiator. Polymerization was allowed to proceed at 60° C. for 1.5 hours. To the polymerization system was added a mixture of 1.25 kg of styrene and 1.25 kg of butadiene as the second-step monomers and polymerization was continued at 60° C. for further 3 hours. Then, to the polymerization system was added 1.25 kg of styrene as the third-step monomer and polymerization was continued for further 1.5 hours. Thereafter, polymerization was terminated by adding 50 ml of methanol used as polymerization stopper. The resulting viscous polymerizate solution was mixed with a large volume of methanol with vigorous stirring to precipitate a polymer which was collected by filtration and dried in vacuo. The polymer, which was obtained in a yield of substantially 100%, showed an intrinsic viscosity of 0.74 dl/g, as measured in toluene at 30° C., and a butadiene content of 25% by weight. It had a melt index (according to JIS K 6760) of 0.5 g per 10 minutes, as measured at 190° C. under a load of 2.16 kg.

Preparation of styrene-butadiene block copolymer B

The block copolymer B was prepared in the same manner as mentioned above, except that 1.5 kg of styrene as the first-step monomer, 1.0 kg of styrene and 1.0 kg of butadiene as the second-step monomers, and 1.5 kg of styrene as the third-step monomer were respectively used. It had an intrinsic viscosity of 0.71 dl/g, a butadiene content of 20% by weight, and a melt index of 0.6 g/10 minutes.

Preparation of styrene-butadiene block copolymer C

In a manner similar to that mentioned above, polymerization was started using a mixture of 15 liters of dry cyclohexane as solvent, 1.50 kg of styrene, 9.0 g of tetrahydrofuran, and a benzene solution containing 75 millimoles of n-butyllithium as initiator. After 1.5 hours of polymerization at 60° C., to the polymerization system was added the second-step monomer mixture of 375 g of styrene and 375 g of butadiene continuously at a constant rate over a period of one hour, and thereafter stirred for 30 minutes. After addition of 500 g of butadiene, the third-step monomer, polymerization was continued for one hour. To the polymerization system was added the fourth-step monomer mixture of 375 g of styrene and 375 g of butadiene continuously at a constant rate over a period of one hour and thereafter stirred for 30 minutes. After final addition of 1.50 kg of styrene, the fifth-step monomer, polymerization was continued for 1.5 hours at 60° C. Polymerization was then terminated by adding 50 ml of methanol as polymerization stopper and 50 g of Sumilizer BHT as an antioxidant (registered trademark of 3,5-di-tert.butyl-4-hydroxytoluene, manufactured by Sumitomo chemical Co.). The resulting viscous polymerizate solution was mixed with a large volume of methanol with vigorous stirring to precipitate a polymer which was collected by filtration and dried in vacuo. The polymer, which was obtained in a yield of substantially 100%, showed an intrinsic viscosity of 0.74 dl/g, as measured in toluene at 30° C., a butadiene content of 25% by weight, and a melt index (in accordance with JIS K 6760) of 0.30 g/10 minutes, as measured at 190° C. under a load of 2.16 kg.

EXAMPLE 1

A predetermined quantity of the pelletized styrene-butadiene block copolymer A obtained in Referential Example and that of a polystyrene (Esbrite #4, registered trademark, molecular weight: 270,000, a product of Nippon Polystyrene Industry Co.) were milled by means of a 6-inch mixing roll mill at a roll-surface temperature of 150° C. for 7 minutes. The resulting resin composition was press-molded at 190° C under 70 kg/cm² to obtain specified test specimens. The results of testing physical properties were as shown in Table 1. For comparison, physical properties of a rubber-modified polystyrene (Esbrite 500A, registered trademark, a product of Nippon Polystyrene Industry Co., molecular weight: 150,000) were also shown in Table 1.

Table 1

| No. | Styrene-butadiene block co-polymer A, % | Polystyrene, % | Tensile strength, kg/cm² | Elongation, % | Izod impact strength[1], kg.cm/cm | Stiffness in flexure, kg/cm² |
|---|---|---|---|---|---|---|
| 1 | 0 | 100 | 425 | 2 | 3.2 | 32,600 |
| 2 | 2 | 98 | 410 | 5 | 5.5 | 31,000 |
| 3 | 20 | 80 | 380 | 18 | 11.5 | 27,000 |
| 4 | 40 | 60 | 270 | 60 | 47.0 | 22,000 |
| 5 | 60 | 40 | 225 | 128 | unbroken | 15,800 |
| 6 | 70 | 30 | 215 | 180 | unbroken | 12,300 |
| 7 | 98 | 2 | 190 | 255 | unbroken | 9,000 |
| 8 | 100 | 0 | 185 | 300 | unbroken | 8,900 |
| 9 | Rubber-modified polystyrene | | 195 | 38 | 48.0 | 21,500 |

| Surface hardness[2], Rockwell M scale | Clouding on being bent | Hinging endurance[3], No. of times | Vicat softening point, °C | Luminous transmittance[4], % |
|---|---|---|---|---|
| 75 | broken | 0 | 92 | 89 |
| 74 | slightly | 5 | 90 | 88 |
| 51 | slightly | 20 | 88 | 88 |
| 42 | slightly | 700 | 79 | 87 |
| 37 | scarcely | 3,600 | 71 | 86 |
| 35 | scarcely | 13,000 | 67 | 86 |
| 26 | no | >100,000 | 56 | 88 |
| 24 | no | >100,000 | 54 | 88 |
| 44 | yes | 46 | 78 | 38 |

Note:
[1] According to JIS K 6871, unnotched
[2] According to ASTM D 785-51, Rockwell hardness, M scale
[3] According to JIS P 8115, folding endurance; tensile load, 1.0 kg; 175 foldings/min.
[4] According to ASTM D 1003-52

As is apparent from Table 1, when the ratio of the styrene-butadiene block copolymer to polystyrene is in the range from 2 : 98 to 20 : 80, the resin composition does not lose its transparency, stiffness, and thermal resistance which are characteristic of polystyrene and shows a certain degree of improvement in impact strength and hinging endurance, indicating increased toughness. When the said ratio is in the range from 20 : 80 to 70 : 30, particularly from 40 : 60 to 60 : 40, the resin composition shows a stiffness, surface hardness, and thermal resistance comparable to those of rubber-modified polystyrene, a marked improvement in elongation and impact strength, and an improvement in clouding when bent and in hinging endurance. When the said ratio is in the range from 70 : 30 to 98 : 2, the resin composition does not lose those properties which are characteristic of the styrene-butadiene block copolymer and shows an improvement in stiffness and thermal resistance.

EXAMPLE 2

The same experiments as in Example 1 were repeated, except that the pelletized styrene-butadiene block copolymer B obtained in Referential Example was used. The results obtained were as summarized in Table 2.

Table 2

| No. | Styrene-butadiene block co-polymer B, % | Polystyrene, % | Tensile strength, kg/cm² | Elongation, % | Izod impact strength, kg.cm/cm | Stiffness in flexure, kg/cm² |
|---|---|---|---|---|---|---|
| 1 | 0 | 100 | 425 | 2 | 3.2 | 32,600 |
| 10 | 2 | 98 | 410 | 5 | 5.0 | 31,000 |
| 11 | 20 | 80 | 385 | 10 | 8.2 | 29,800 |
| 12 | 40 | 60 | 298 | 30 | 32.0 | 26,500 |
| 13 | 60 | 40 | 260 | 43 | 45.3 | 22,100 |

Table 2-continued

| No. | Styrene-butadiene block copolymer C, % | Polystyrene, % | Tensile strength, kg/cm² | Elongation, % | Izod impact strength, unnotched, kg.cm/cm | Stiffness in flexure, kg/cm² |
|---|---|---|---|---|---|---|
| 14 | 70 | 30 | 252 | 60 | 48.0 | 20,900 |
| 15 | 98 | 2 | 240 | 180 | unbroken | 16,000 |
| 16 | 100 | 0 | 230 | 220 | unbroken | 15,800 |
| 9 | Rubber-modified polystyrene | | 195 | 38 | 48.0 | 21,500 |

| Surface hardness, Rockwell M scale | Clouding on being bent | Hinging endurance, number of times | Vicat softening point, °C | Luminous transmittence, % |
|---|---|---|---|---|
| 75 | broken | 0 | 92 | 89 |
| 74 | slightly | 3 | 92 | 88 |
| 55 | slightly | 7 | 88 | 88 |
| 44 | slightly | 570 | 80 | 88 |
| 38 | slightly | 2,760 | 75 | 87 |
| 36 | scarcely | 8,800 | 73 | 88 |
| 30 | no | 70,000 | 66 | 88 |
| 28 | no | 89,000 | 65 | 88 |
| 44 | yes | 46 | 78 | 38 |

Dependency of characteristic properties of the resin composition on the ratio of the styrene-butadiene block copolymer to polystyrene was similar to that in Example 1.

EXAMPLE 3

The same experiments as in Example 1 were repeated, except that the pelletized styrene-butadiene block copolymer C obtained in Referential Example was used. The results obtained were as summarized in Table 3.

Dependency of characteristic properties of the resin composition on the ratio of the styrene-butadiene block copolymer to polystyrene was similar to that in Example 1.

Table 3

| No. | Styrene-butadiene block copolymer C, % | Polystyrene, % | Tensile strength, kg/cm² | Elongation, % | Izod impact strength, unnotched, kg.cm/cm | Stiffness in flexure, kg/cm² |
|---|---|---|---|---|---|---|
| 1 | 0 | 100 | 425 | 2 | 3.2 | 32,600 |
| 17 | 2 | 98 | 420 | 5 | 3.6 | 32,200 |
| 18 | 20 | 80 | 382 | 15 | 8.2 | 26,500 |
| 19 | 40 | 60 | 348 | 34 | 12.6 | 21,800 |
| 20 | 60 | 40 | 294 | 53 | 16.3 | 17,500 |
| 21 | 70 | 30 | 275 | 92 | 19.2 | 15,800 |
| 22 | 98 | 2 | 211 | 235 | 20.9 | 12,700 |
| 23 | 100 | 0 | 210 | 350 | 22.0 | 12,400 |
| 9 | Rubber-modified polystyrene | | 195 | 38 | 48.0 | 21,500 |

| Surface hardness, Rockwell M scale | Clouding on being bent | Hinging endurance, No. of times | Vicat softening point, °C | Luminous transmittance, % |
|---|---|---|---|---|
| 75 | broken | 0 | 92 | 89 |
| 74 | slightly | 2 | 92 | 88 |
| 57 | slightly | 13 | 87 | 86 |
| 46 | slightly | 58 | 79 | 85 |
| 40 | scarcely | 120 | 71 | 86 |
| 39 | scarcely | 350 | 70 | 87 |
| 34 | no | 2,530 | 59 | 87 |
| 34 | no | 3,270 | 59 | 88 |
| 44 | yes | 46 | 78 | 38 |

What is claimed is:

1. A resin composition consisting essentially of polystyrene having a molecular weight of 150,000 to 500,000 and
a styrene-butadiene block copolymer represented by the formula $A_1$—$B_1$—C—$B_2$—$A_2$,
wherein $A_1$ and $A_2$ represent non-elastomeric blocks composed of polymeric styrene chains, $B_1$ and $B_2$ represent elastomeric blocks composed of random-copolymer chains containing styrene and butadiene units uniformly distributed therein, C represents an elastomeric block composed of a polymeric butadiene chain or a styrene-butadiene copolymer chain, the total amount of $A_1$ and $A_2$ is 40 to 80% by weight, the total amount of $B_1$ and $B_2$ is 10 to 60% by weight, the amount of C is 0 to 25% by weight provided that the amount of C is smaller than the total amount of $B_1$ and $B_2$, the weight ratio of $A_1$ to $A_2$ is 2:8 to 8:2, the weight ratio of $B_1$ to $B_2$ is 0:10 to 10:0, the weight ratio of styrene to butadiene in $B_1$ and $B_2$ is 10:90 to 75:25, and the weight ratio of styrene to butadiene in C is 0:100 to 10:90, the total styrene content to said styrene-butadiene block copolymer being 65 to 90% by weight, the total butadiene content of said block copolymer being 10 to 35% by weight, and said block copolymer having an intrinsic viscosity of 0.35 to 1.8 dl/g, as measure in toluene at 30° C, said resin composition obtained by mixing said polystyrene and said block copolymer.

2. A resin composition according to claim 1, wherein molecular weight of the polystyrene is 200,000 to 400,000.

3. A resin composition according to claim 1, wherein weight ratio of the styrene-butadiene block copolymer to the polystyrene is from 2 : 98 to 20 : 80.

4. A resin composition according to claim 1, wherein weight ratio of the styrene-butadiene block copolymer to the polystyrene is from 20 : 80 to 70 : 30.

5. A resin composition according to claim 1, wherein the weight ratio of the styrene-butadiene block copolymer to the polystyrene is from 70 : 30 to 98 : 2.

6. A resin composition according to claim 1, wherein said composition is incorporated with a stabilizer, a colorant, and a lubricant.

* * * * *